United States Patent [19]

Okada

[11] Patent Number: 4,679,789
[45] Date of Patent: Jul. 14, 1987

[54] VIDEO GAME APPARATUS WITH AUTOMATIC SKILL LEVEL ADJUSTMENT

[75] Inventor: Kazuo Okada, Tokyo, Japan

[73] Assignee: Kabushiki Kaisha Universal, Tochigi, Japan

[21] Appl. No.: 890,897

[22] Filed: Jul. 28, 1986

Related U.S. Application Data

[63] Continuation of Ser. No. 686,483, Dec. 26, 1984, abandoned.

[30] Foreign Application Priority Data

Dec. 26, 1983 [JP] Japan .............................. 58-198413[U]
Dec. 26, 1983 [JP] Japan .............................. 58-198414[U]

[51] Int. Cl.[4] .............................................. A63F 9/22
[52] U.S. Cl. .............................. 273/1 E; 273/DIG. 28
[58] Field of Search ................ 273/1 E, 1 GC, 237, 273/85 G, 138 A; 358/342

[56] References Cited

U.S. PATENT DOCUMENTS 3,855,426 12/1974 Bouwhuis ......................... 358/342
4,305,131 12/1981 Best ................................ 273/DIG. 28
4,381,864 5/1983 Bromley et al. ................. 273/85 G
4,398,717 8/1983 Rosenfeld et al. ............... 273/1 GC
4,424,967 1/1984 Yokoi et al. ..................... 273/1 GC Primary Examiner—Richard C. Pinkham
Assistant Examiner—MaryAnn Stoll Lastova
Attorney, Agent, or Firm—Young & Thompson

[57] ABSTRACT

In a video game apparatus, as a game progresses, whether or not an operation section has been operated by a player within a permissible timing set in a reference table is judged by a judgement section, and the game success or failure is determined upon the judgement result. The judgement section outputs a judgement signal in accordance with the judgement result, and the judgement signal is counted by a judgement counting section. And, for instance, if a judgement signal corresponding to a game success is counted up until it reaches a preset value, the player is judged as an expert in the game, and the permissible timing range set in the reference table is automatically adjusted to make it narrower and to make the game more difficult for the player. Additionally, in order to change a game picture image at an instant in response to the success or failure of the game, at least two read out heads are provided both accessing a disk, and one of the heads is made effective for the display of a game picture image in response to the judgement result in the judgement section.

6 Claims, 11 Drawing Figures

VIDEO GAME APPARATUS WITH AUTOMATIC SKILL LEVEL ADJUSTMENT

This application is a continuation, of application Ser. No. 686,483, filed 12/26/84, now abandoned.

BACKGROUND OF THE INVENTION

The present invention relates to a video game apparatus, and more particularly it relates to a video game apparatus which can automatically adjust the relative difficulty of the game in accordance with the skill of the player.

In general, the progress of a video game is carried out by manipulating an operation section such as button, lever, or the like, while looking at the picture image displayed on a CRT. The progress of the game is changed based upon whether the operating timing of the operation section is within a permissible time duration relative to the progress of the game, and the picture image displayed on the CRT is also changed accordingly. For example, if the operating timing is within the permissible time duration, a picture image for a success pattern is displayed, and if the operating timing is out of the permissible time duration, a picture image for a failure pattern is displayed.

These picture images for a video game are regenerated from graphic data stored in a storage device such as a laser disk, magnetic disk, or ROM cartridge. Since the storage capacity of each storage device is limited, the player becomes skillful in playing the game as he or she tries frequently. Therefore, for a skilled player, it is easy to make the operating timing of the operation section occur within the permissible time duration, and the player becomes tired of the game. While on the other hand, a beginner frequently fails in an earlier stage in the game progress, and there is no time to spare in enjoying the game. These problems result from the fact that the judgement of the operating timing of the operation section is made based upon a fixed permissible time duraioin, regardless of whether the player is an expert or a beginner.

The picture image for a game is changed either into a success pattern or a failure pattern, in accordance with the suitability of the operating timing of the operation section. In a conventional video game apparatus using a laser disk, a read-out head of the laser disk is moved to a preset position in accordance with a signal from a judgement means for judging the suitability of the operating timing of the operating section. In such a conventional apparatus, a display pattern for a failure in the game is likely to become uniform, and in addition, during a time while a read-out head is moved to a present position in the failure of the game, that is, so called access time, there arises a disadvantage that the display of the picture images is liable to be interrupted. Furthermore, in a laser disk of the type in which graphic data for a success pattern and a failure pattern are alternately disposed in the disk, since the read out head must be passed over the region storing graphic data for the failure pattern every time the game is missed, the above described interruption in displaying picure images is likely to occur.

OBJECTS OF THE INVENTION

It is an object of the present invention to provide a video game apparatus which can be applicable both to an expert and to a beginner while retaining the interest of either in the game.

It is another object of the present invention to provide a video game apparatus which can automatically adjust the relative difficulty of the game in accordance with the skill of the player.

It is a further object of the present invention to provide a video game apparatus which can change picture images during the progress of the game at an instant.

Summary of the Invention

The above objects of the present invention are achieved by adjusting a permissible time duration in accordance with the skill of the player, by judging whether the operation section was manipulated by the player within the permissible time duration or not. According to the preferred embodiment of the present invention, the skill of the player is judged from the records of the game having been played, and based upon the judgement result, the above permissible time duration is increased or decreased. The time duration is converted as the number of clock pulses, and is easily adjusted under the control of a CPU controlling the progress of the video game.

In order to change the game picture images at an instant, graphic data for displaying picture images are stored in a memory medium of a disk type such as a laser disk, magnetic disk, or the like, and plural read-out heads are provided for a single piece of memory medium. The plural read-out heads access respectively different regions of the single piece of memory medium. One of the plural read heads is effective at any given time, and only the graphic data obtained therefrom is used for displaying a picture image on the CRT.

BRIEF DESCRIPTION OF THE DRAWINGS

These and other objects, advantages, construction, will become more apparent as the description proceeds, when considered with the accompanying drawings in which.

DETAILED DESCRIPTION OF THE INVENTION

Figure 1:
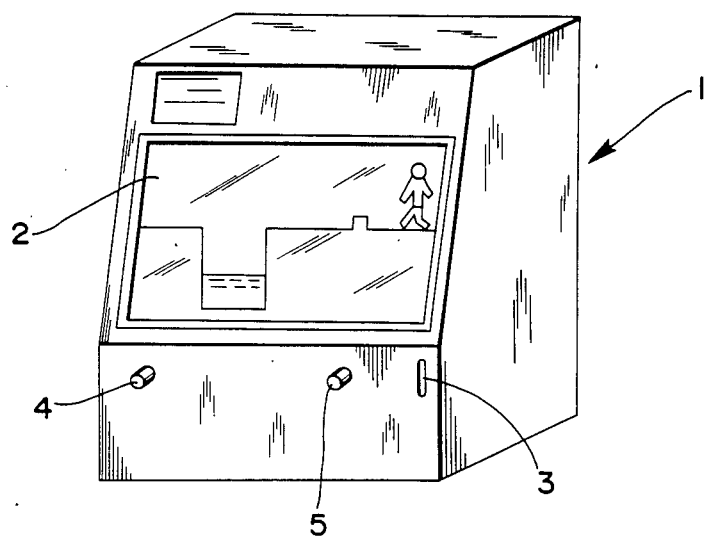
FIG.1 is an outer appearance showing a video game apparatus according to an embodiment of the present invention.
Figure 2A:
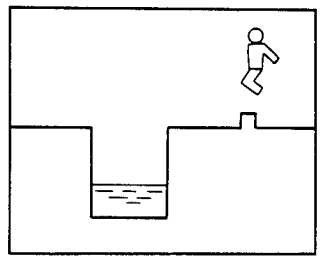
FIGS. 2A, 2B, 3A, 3B, 4A, 4B, 5A and 5B are conceptual views respectively showing picture images displayed on a CRT according to an embodiment of the present invention.
Figure 3A:
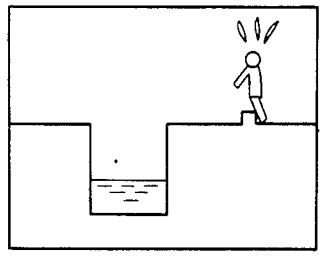

Referring now to FIG. 1, the front face of a video game apparatus 1 has an exposed display plane 2 of a CRT for displaying a picture image required for the progress of the game. The display plane 2 may be a screen of a projecting type television apparatus or the like. A coin is inserted through a coin slot 3, and upon depression of a game start button 4, a game starts. As the game starts, a human character illustratively shown in the display plane 2 of FIG. 1, is moved to walk from the right to the left in the picture to thereby display successive picture images. On a passage along which the human character walks, a protruding obstacle is displayed. While looking at the picture image wherein the human character walks toward the projecting obstacle, the player actuates an operation button 5 with a suitable timing to thereby obtain picture images of success patterns wherein the obstacle is being cleared, as shown in FIGS.2(A) and (B). If the button operating timing is too fast or late, then picture images for failure patterns are displayed as shown in FIGS.3(A) and (B). After the extruding obstacle has been cleared, the human character continues to walk and approaches a trench obstacle. In this case, if the operation button 5 is depressed with a suitable timing, then a success pattern as shown in FIG.4 is displayed, while if the operating timing goes out of range, then a failure pattern as shown in FIG.5 is displayed. The gist of the present invention, of course does not reside in the displayed picture patterns, and other various patterns may be used. For example, a failure pattern in the case that the operation button 5 is depressed too fast, and a failure pattern in the case that the operation button 5 is depressed too late, can respectively be thought of.

Figure 4A:
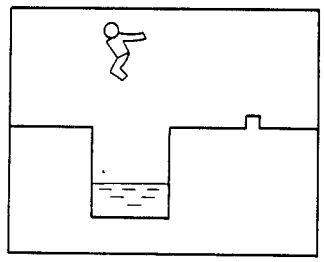
Figure 4B:
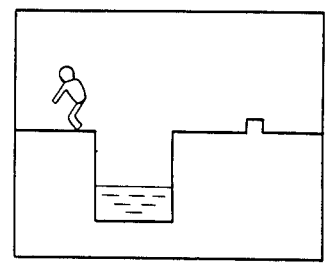
Figure 5A:
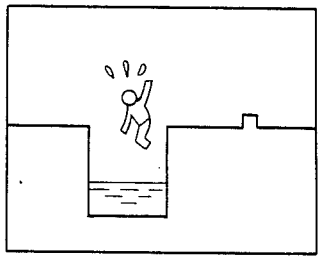
Figure 5B:
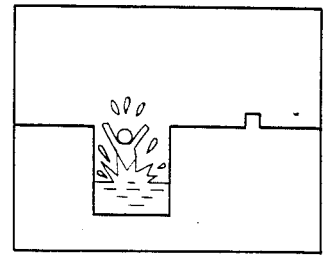
Figure 6:
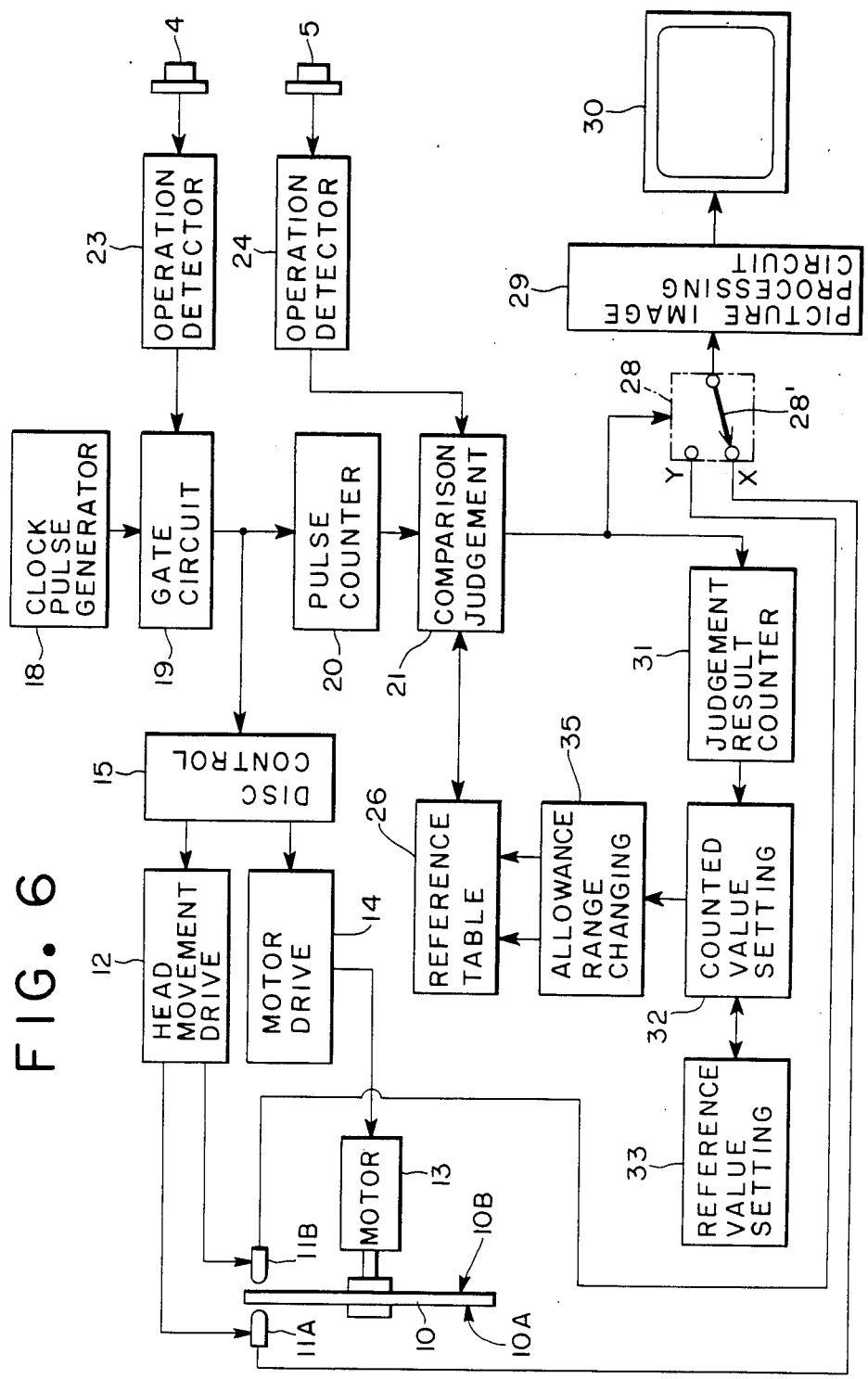
FIG.6 is a system block diagram showing a main construction according to the present invention.

In FIG.6 showing a construction with which the above described game can be performed, one side 10 A of a laser disk 10 which is rotated by a motor 13 has graphic data concentrically recorded thereon, the graphic data being used for displaying on the display plane 2 picture images, such as patterns used just after the game start, game success patterns as of FIGS. 2(A) and (B), FIGS. 4(A) and (B), and succeeding game progressing patterns. While the other side 10 B has graphic data for displaying picture images of FIGS. 3(A) and (B), FIGS. 5(A) and (B) recorded on the location corresponding to the graphic data for the failure patterns for the game. Two read out heads 11A and 11B advanced to the center of the laser disk 10 by a common head movement drive 12 access one of the sides 10 A and 10 B of the laser disk 10, respectively. Picture image signals obtained from the read out heads 11A and 11B, are delivered through independently mounted lead wires to terminals X and Y of a signal change over circuit as described later. The head movement drive 12 and a motor drive 14 for driving the motor 13 are be controlled by a disk controller 15.

As the game start button 4 is actuated, each circuit section is reset to an initial condition by a known reset mechanism (not shown), and the count value of a pulse counter 20 is set "0" and a contact 28' of the signal change over circuit 28 is connected as shown in the figure to a terminal X. At the same time, an operation detector 23 outputs a high level signal (hereinafter referred to as "H" signal) to open the gate of a gate circuit 19. Thus, clock pulses generated serially from a clock pulse generator 18 are supplied through the gate circuit 19 to the disk controller 15 to thereby enable the disk system. At this time instant, since the contact 28' of the signal changeover circuit 28 is connected to the terminal X, a picture image signal retrieved from the read out head 11A is supplied to a picture image signal processing circuit 29 so that a game picture image as shown in FIG.1 is displayed on a CRT 30. The pulses from the clock pulse generator 18 are also supplied to the pulse counter 20 concurrently as from the depression of the game start button 4. The pulse counter 20 accumulates the number of pulses to be supplied.

Figure 2B:
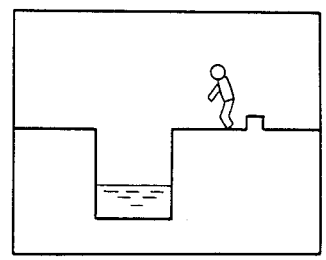

As the game progresses, then a time comes when the game progress is selected or the operation button 5 is actuated. Upon actuation of the operation button 5, the count value at that instant of the pulse counter 21 is loaded into a comparison judgement section 21. The comparison judgement section 21 judges whether the count value of pulses delivered from the pulse counter 20 is included within a permissible range set in a reference table 26. For example, if a lower limit of the set value in the reference table is 10000 and an upper limit is 10100, and if the counted value loaded from the pulse counter 20 is 10090 which suffices the set data in the reference table 26, then the comparison judgement section 21 outputs an "L" signal. If the "L" signal is input to the signal change over circuit 28, the contact 28' continues to be connected to the terminal X so that the game success pattern as shown in FIG. 2 is continued to be displayed on the CRT 30.

Figure 3B:
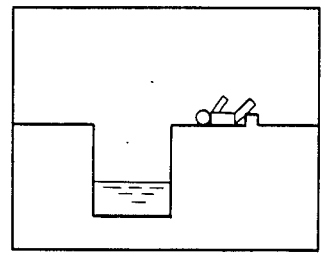

If the count value of the pulse counter 20 at the time when the operation button 5 is depressed is outside the permissible range as in the reference table 26, then the comparison judgment section 21 outputs a "H" signal to the signal change over circuit 28. As a result, the contact 28' is changed to connect from the terminal X to the terminal Y. Therefore, the picture image signal to be supplied to the picture image signal processing circuit 29 is changed over at an instant to the picture image signal obtained from the read out head 11B. Thus, on the CRT 30, a game failure pattern as shown in FIG. 3 is smoothly displayed succeeding the game progressing pattern as shown in FIG. 1. The instant changeover of the picture image can be obtained by using plural read-out heads 11A and 11B. Thus, an access time required in the case using a single read out head is not needed, that is, a time lag while the read-out head is moved from the success pattern signal region to the failure pattern signal region is eliminated. In the case of a failure of the game, each circuit section is reset to enable to start a game again.

While the operating timing of the operation button 5 remains within an allowable range set in the reference table 26, the game continues to progress, until it reaches the stages of the game progress as shown in FIGS. 4 and 5. Since the pulse counter 20 has been counting clock pulses from the game start, the second operating timing of the operation section 5 is again compared with the set data in the reference table 26 by the comparison judgement section 21. Since the reference table 26 has as a matter of course a set data to be compared at the second time, e.g., a range from 20000 to 20080, the second operating timing of the operation button 5 is judged based upon the stored range. The following processes are the same as in those of the first operating timing.

Every time success is obtained during the progress of the game, an "L" signal is produced from the comparison judgement section 21, which is also supplied to the judgement result counter 31. The judgement result counter 31 counts the number of "L" signals from the comparison judgement section 21, and the counted value is compared with the preset value stored in a reference value setting section 33 by a counted value comparison section 32. And when the count value in the judgement result counter 31 reaches the preset value of the reference value setting section 33, the counted value comparison section 32 outputs an adjustment signal to a permissible range changing section 35. In response to this, the permissible range changing section 35 operates to initiate the change of the written data regarding the permissible timing range to be stored in the reference table 26. For example, the initial permissible range from 10000 to 10100 is narrowed to a permissible range from 10020 to 10080. In order to narrow the permissible range as described above, an adder and a subtracter are actuated in response to the adjustment signal from the counted value comparison section 32, respectively adding "20" to the lower limit data "10000" and subtracting "20" from the upper limit data "10100".

As the player becomes skillful in playing the game while performing the above processings and the occurrence of the success becomes frequent, the permissible timing range of the operation button 5 is narrowed to thereby make the game more difficult. It is preferable to increase the point gain for such a difficult game. Further, the count value of the judgment result counter 31 may be subtracted in the case a "H" signal or a game failure signal is input to the judgement result counter 31.

In order to take into consideration a beginner for the game, the number of signals from the comparison judgement section 21 may be counted by the judgement result counter 31 to compare the counted result with a preset value set in the reference setting section 33, and the permissible range stored in the reference table 26 may be broadened when both values coincide with each other.

Besides the above embodiment, another judgement method for judging the skill of the player may be employed in which a difference, of the time when the operation button 5 is operated which results in a failure, from the upper or lower limit of the permissible range is used as a reference to the skill of the player. In this case, the comparison judgement section 21 judges the timing with reference to the reference table 26. The comparison judgement section 21 derives a difference between the operating timing and the upper or lower limit of the permissible range of the reference table 26, and adds the difference value to the judgement result counter 31. And when the number of failures reach a predetermined number, the failure number is compared with a preset value at the reference value setting section 33. If the set value of the reference setting section 33 is largely apart from the operating timing, then the player is judged as a beginner, and the permissible timing range is broadened through the counted value comparison section 32 as described above.

Figure 7:
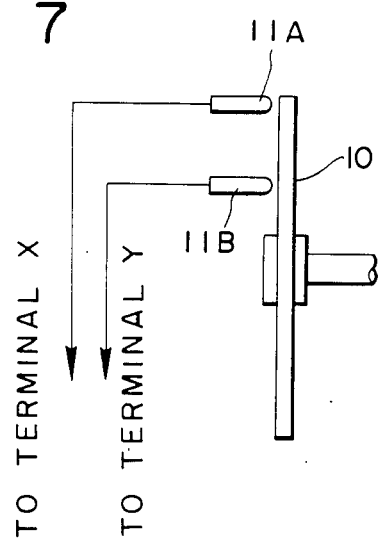
FIG.7 is a schematic brief view showing another embodiment of a read out head incorporated in the present invention.

FIG. 7 shows another arrangement of read-out heads. In the example, the read-out heads 11A and 11B are both arranged to read out a picture image signal from one side of the laser disk 10. In this case, a game failure pattern is read out by the read-out head 11B, and therefore, the picture image signal region regarding the failure pattern is formed in a shorter diameter region of the disk 10. By combining the embodiments shown in FIGS. 6 and 7, the number of read-out heads need not necessarily be limited to two. For example, three read out heads may be provided for a single laser disk, and these may be, in accordance with the operating timings of the operation button, one for a success pattern, and the others for failure patterns respectively for too fast and late timings. Thus, the uniformity of display patterns may be avoided.

In carrying out an instant changeover of a display picture image, generally only one of the heads 11A, for example, is used to read out a signal by irradiating a regenerating laser beam with a shutter opened for the head, while the other head 11B is moved with another shutter closed to intercept a laser beam irradiation. And with a changeover signal from the comparison judgement section 21, the shutters are reciprocally changed over to effectively select the read-out head. Further, as shown in FIG. 6, in the case both read-out heads 11A and 11B are equally moved by the common head movement drive 12, it is necessary that both graphic data for a success pattern of the side 10A of the laser disk 10 and graphic data for a failure pattern of the side 10B are recorded respectively in opposite corresponding positions of respective sides. However, according to the present invention it is not necessarily limited thereto, and a plurality of read-out heads may be moved by respective independent head movement drives.

I claim:

1. In a video game apparatus of the type in which a player actuates an operation section while looking at a game picture image displayed and a success or failure of the game is determined by an operating timing of the operation section; the improvement comprising:

a reference table for setting a permissible range of said operating timing indicative of the success of the game;

timing detection means for detecting a timing of the operation section operated by a player, said timing detection means comprising a clock pulse generator and a pulse counter for counting the number of pulses generated by said generator;

judgment means for emitting a first type of signal when the timing detected by said timing detection means is within the permissible range set by said reference table, and emitting a second type of signal when the timing detected by said timing detection means is outside the permissible range set by said reference table;

judgment result counting means for counting at least one of said first and second types of signals output from said judgment means;

counted value detection means for outputting an adjustment signal when it is detected that the counted value in said judgment result counting means has reached a preset value; and permissible range changing means for changing the permissible range set in said reference table in accordance with said adjustment signal.

2. A video game apparatus according to claim 1, wherein said judgement means outputs a difference between a timing detected by said timing detection means and an upper or lower limit value defining the permissible range set in said permissible range changing means.

3. A video game apparatus according to claim 2, wherein said permissible range changing means comprises a subtracter for subtracting a predetermined value from a lower limit value of said permissible range and an adder for adding said predetermined value to an upper limit value of said permissible range.

4. In a video game apparatus of the type in which a player actuates an operation section while looking at a game picture image displayed and a success or failure of the game is determined by an operating timing of the operation section; the improvement comprising:

a reference table for setting a permissible range of said operating timing indicative of the success of the game;

timing detection means for detecting a timing of the operation section operated by a player, said timing detection means comprising a clock pulse generator and a pulse counter for counting the number of pulses generated by said generator;

judgment means for emitting a first type of signal when the timing detected by said timing detection means is within the permissible range set by said reference table, and emitting a second type of signal when the timing detected by said timing detection means is outside the permissible range set by said reference table;

judgment result counting means for counting at least one of said first and second types of signals output from said judgment means;

counted value detection means for outputting an adjustment signal when it is detected that the counted value in said judgment result counting means has reached a preset value;

permissible range changing means for changing the permissible range set in said reference table in accordance with said adjustment signal;

a disk formed therein comprising a first signal region where signals for displaying a progressing picture image for a game and a success picture image for the game are recorded in succession, and second signal region where signals for displaying a failure picture image for the game are recorded;

a first read-out head for reading out a picture image signal by accessing said first signal region;

a second read-out head for reading out a picture image signal by accessing said second signal region, while said first read-out head is accessing said first signal region;

picture image signal changeover means for: inactivating said first read-out head and activating said second read-out head, responsive to said second signal; and inactivating said second read-out head and activating said first read-out head, responsive to said first signal.

5. Video game apparatus according to claim 1, wherein said judgment result counting means counts said first type of signal, and said permissible range-changing means narrows the permissible range set in said reference table in accordance with said adjustment signal.

6. Video game apparatus according to claim 1, wherien said judgment means counts said second type of signal, and said permissible range-changing means widens the permissible range set in said reference table in accordance with said adjustment signal.

* * * * *